2,865,952
ETHYL-3-CHLORO-2-HYDROXY-3-BUTENOATE

Harry A. Stansbury, Jr., South Charleston, and Howard R. Guest, Charleston, W. Va., assignors to Union Carbide Corporation, a corporation of New York No Drawing. Application November 12, 1954
Serial No. 468,578

1 Claim. (Cl. 260—484)

This invention relates to certain novel derivatives of 2-chloro-acrolein and more particularly to a group of novel compounds comprising the nitrile and ethyl ester of 3-chloro-2-hydroxy-3-butenoic acid, as well as to a method of making these compounds.

The compounds of the present invention are characterized by the fact that they are tetrafunctional, and thus are capable of undergoing many different types of reaction. For example it has been found, as pointed out in more detail hereafter, that ethyl 3-chloro-2-hydroxy-3-butenoate can be readily copolymerized with styrene or acrylonitrile to form polymers that may be considered chlorhydrins, since they have adjacent chlorine and hydroxy groups. Both of such groups are capable of reaction to form modified polymers. More generally, the tetrafunctionality of the present compounds makes them useful as starting materials in variety of polymerization, condensation and other types of reactions.

The compounds of the present invention can be conveniently prepared from acrolein. The acrolein is treated with chlorine to form 2,3-chloropropionaldehyde according to the following equation:

$$CH_2=CH.CHO + Cl_2 \rightarrow ClCH_2.CHCl.CHO$$

The 2,3-dichloropropionaldehyde thus formed is then converted to 2-chloroacrolein. Dehydrochlorination of the dichloropropionaldehyde is readily effected in the presence of hot water—

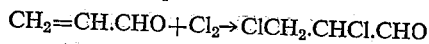

The resulting 2-chloroacrolein is treated with hydrogen cyanide to form 2-chloroacrolein cyanohydrin which can also be described as the nitrile of 3-chloro-2-hydroxy-3-butenoic acid.

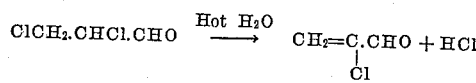

This compound is unusual in that it contains a reactive double-bond, a chlorine group, a hydroxyl group and a cyano group in a small molecule.

It is desirable in carrying out the foregoing reaction that essentially anhydrous 2-chloroacrolein be used, since water exerts a strong dissociative effect on cyanohydrins and the reaction mixture must have a low water content if good yields of the nitrile are to be obtained.

If it is desired to prepare an ester of 3-chloro-2-hydroxy-3-butenoic acid, conversion of the nitrile to the ester can be effected by treating the nitrile with alcoholic hydrochloric acid according to the following equation:

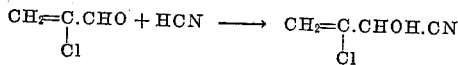

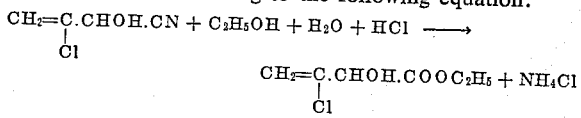

It will be noted that the nitrile and ethyl ester of 3-chloro-2-hydroxy-3-butenoic acid, whose preparation is outlined above, each contain four different functional groups in a relatively small molecule and hence they are exceptionally versatile in their reactions with other compounds and are very useful intermediates for further synthesis.

In order to point out more fully the nature of the present invention the following specific examples are given of methods of making the nitrile and ethyl ester of 3-chloro-2-hydroxy-3-butenoic acid, as well as methods of copolymerizing the ester with styrene and acrylonitrile.

Example I.—Preparation of 2-chloroacrolein cyanohydrin from refined 2-chloroacrolein A mixture of 0.6 gram of potassium cyanide (.01 equivalent) and 54 grams of hydrogen cyanide (2 moles) was stirred at −3° C. to 0° C. while 180 grams of pure 2-chloroacrolein (2 moles) were fed over a period of 30 minutes. After the solution was stirred at 0° C. for 10 minutes longer, it was acidified with 1 cc. of concentrated, 37 percent hydrochloric acid. The crude product was distilled under reduced pressure to obtain 2-chloroacrolein cyanohydrin having the following properties: boiling point at 3 mm. absolute—86° C.; refractive index $n_D{}^{30}$—1.4665; specific gravity 20°/20°—1.250. The molecular weight of the product as determined by the Menzies-Wright method was 116 as compared with a theoretical value of 117.5. Analysis of the product showed 30.9% chlorine and 11.3% nitrogen as compared with theoretical values of 30.2% chlorine and 11.9% nitrogen. The yield and efficiency were 79 percent.

Example II.—Reaction of hydrogen cyanide with crude 2-chloroacrolein

A solution of 114 grams of 97 percent acrolein (2 moles) in 228 grams of benzene was chlorinated at 0° C. to 5° C. until 142 grams (2 moles) had been absorbed to form 2,3-dichloropropionaldehyde. While 2 liters of water was refluxed at atmospheric pressure the crude 2,3-dichloropropionaldehyde solution was fed thereto over a period of an hour. The top layer (oil) of the distillate was continually removed while the lower layer was returned as reflux. The distillation was continued for 15 minutes to remove all of the steam-distillable oil from the system. The oil layer of the distillate weighed 319 grams and by analysis with hydroxylamine was found to contain 35.7 percent of 2-chloroacrolein. These results corresponded to a 63 percent yield and efficiency to crude 2-chloroacrolein solution.

A mixture of 0.4 gram of potassium cyanide catalyst (.006 equivalent) and 37 grams of hydrogen cyanide (1.38 moles, 10% excess) was stirred at 15° C.–18° C. while the 319 grams of 35.7 percent 2-chloroacrolein solution were added over a period of 45 minutes. Since very little heat was evolved, 0.4 gram more of potassium cyanide catalyst (.006 equivalent) were added all at once. An exothermic reaction immediately began and the maximum temperature was held at 35° C. by strong cooling. After the mixture was stirred at 10° C. to 20° C. for 30 minutes, it was acidified with 1 cc. of concentrated hydrochloric acid. The crude product was distilled under reduced pressure to obtain 2-chloroacrolein cyanohydrin with 78 percent yield and efficiency based on the crude 2-chloroacrolein.

Example III.—Preparation of ethyl 3-chloro-2-hydroxy-3-butenoate

A mixture of 708 grams of anhydrous ethanol (15.4 moles), and 28 cc. of water (1.54 moles) was stirred at 25° C. to 45° C. while 124 grams of dry hydrogen chloride (3.4 moles) were added. Then 181 grams of 2-chloroacrolein cyanohydrin (1.54 moles) were fed at 40° C. to 45° C. over a period of 10 minutes. After the mixture was stirred and refluxed at 79° C. for 1.3 hours, it was cooled to 25° C. and filtered to remove ammonium chloride.

The filtrate was fractionated to obtain ethyl 3-chloro-2-hydroxy-butenoate having the following properties: boiling point 63° C./3 mm.; refractive index $n_D^{30}$—1.4530; specific gravity at 20° C./20° C.—1.202; molecular weight observed by the Menzies-Wright method—159.8 (theory 164.5). Analysis showed the product to contain 21.9% chlorine, 43.3% carbon and 5.7% hydrogen, as compared with theoretical values of 21.6% chlorine, 43.8% carbon and 5.5% hydrogen. The compound was further identified as ethyl 3-chloro-2-hydroxy-3-butenoate (rather than an isomer) by investigation of its infra-red and ultra-violet absorption characteristics.

*Example IV.—Copolymerization of ethyl-3-chloro-2-hydroxy-3-butenoate and acrylonitrile*

A Pyrex tube was charged with 3.0 grams of ethyl-3-chloro-2-hydroxy-3-butenoate, 7.0 grams of acrylonitrile, 10.0 ml. of acetone, and .25 ml. of a 25% solution of diacetyl peroxide in dimethyl phthalate. The gas phase was flushed with nitrogen, and the tube was then chilled in solid carbon dioxide and sealed, after which it was placed in a water bath maintained at 50° C. and rocked gently for 21 hours. At the end of this period the tube was again chilled and broken open. The polymer was recovered by precipitation in isopropanol, filtered, and dried overnight in an air oven at 55° C. to 60° C. The polymer yield was 2.5 grams (25% conversion). It had a reduced viscosity of 0.28 in dimethylformamide at 30° C. and analyzed 73% polyacrylonitrile.

The copolymer is soluble in solvents, such as dimethylformamide, from which strong and flexible fibers, films and coatings can be prepared. Such copolymers have improved flame-resistance, anti-static properties, and adhesive qualities, contributed in the first instance, by their chlorine content, and in the other two instances by their hydroxyl content.

As compared to the non-chlorine containing ester, ethyl 2-hydroxy-3-butenoate, the chloro ester of this invention copolymerizes with acrylonitrile at a rate which is about twice as fast, and the resulting copolymers have a higher molecular weight. The following table presents data on comparative polymerizations, carried out under the same conditions given above:

ACRYLONITRILE COPOLYMERIZATIONS

| Co-Monomer | Percent Acrylonitrile in Monomers Charged | Percent Acrylonitrile in Copolymer | Relative[1] Rate of Copolymerization | Reduced Viscosity in Dimethylformamide |
|---|---|---|---|---|
| Ethyl 3-Chloro-2-hydroxy-3-butenoate | 70.0 | 73.1 | 1.2 | 0.28 |
| Do | 30.0 | 51.8 | 2.5 | |
| Ethyl 2-hydroxy-3-butenoate | 70.0 | 85.3 | 2.5 | |
| Do | 30.0 | 65.8 | 4.5 | 0.09 |

[1] Acrylonitrile is the component having the faster rate of polymerization.

*Example V.—Copolymerization of ethyl-3-chloro-2-hydroxy-3-butenoate and styrene*

Using the procedure of Example IV a tube was charged with 3.0 grams of ethyl-3-chloro-2-hydroxy-3-butenoate, 7.0 grams of styrene, 10.0 ml. of benzene, and .25 ml. of a 25% solution of diacetyl peroxide. After 28.5 hours at 50° C. the polymer yield was 1.3 grams (13% conversion). The polymer had a reduced viscosity of 0.13 in benzene at 30° C. and analyzed 5.6% of the butenoate, by chlorine analysis.

The copolymer is useful in forming films from benzene solutions which have improved anti-static properties.

What is claimed is:

As a new composition of matter, ethyl 3-chloro-2-hydroxy-3-butenoate.

References Cited in the file of this patent

UNITED STATES PATENTS

| | | |
|---|---|---|
| 2,464,740 | Adelson | Mar. 15, 1949 |
| 2,498,532 | Dean | Feb. 21, 1950 |
| 2,526,008 | Croxall et al. | Oct. 17, 1950 |
| 2,570,886 | Tabet | Oct. 9, 1951 |
| 2,692,875 | Weinstock et al. | Oct. 26, 1954 |
| 2,700,027 | Bruson | Jan. 18, 1955 |

OTHER REFERENCES

Lespieau: 6 Chem. Abst., p. 620 (1912).
Stitz: 4 Chem. Abst., pp. 7226–7 (1950).
Gudgeon et al.: 46 Chem. Abst., p. 880 (1952).